(12) United States Patent
Chang et al.

(10) Patent No.: US 6,298,343 B1
(45) Date of Patent: *Oct. 2, 2001

(54) METHODS FOR INTELLIGENT UNIVERSAL DATABASE SEARCH ENGINES

(75) Inventors: Jackson C. S. Chang, Taipei; David D. S. Ho, Chung Ho, both of (TW); Leslie L. M. Xia, Shanghai (CN)

(73) Assignee: Inventec Corporation (TW)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/998,955

(22) Filed: Dec. 29, 1997

Related U.S. Application Data

(63) Continuation of application No. 08/998,955, filed on Dec. 29, 1997.

(51) Int. Cl.[7] ..................................... G06F 9/00
(52) U.S. Cl. ..................................... 707/5; 707/4
(58) Field of Search ........................ 707/1–204

(56) References Cited

U.S. PATENT DOCUMENTS 5,388,196 * 2/1995 Pajak et al. .................. 345/329
5,634,051 * 5/1997 Thomson .......................... 707/5
5,878,423 * 3/1999 Anderson et al. ............. 707/100

* cited by examiner

Primary Examiner—Thomas Black
Assistant Examiner—John G. Mills
(74) Attorney, Agent, or Firm—Chien-Wei (Chris) Chou; Anthony B. Diepenbrock, I; Oppenheimer Wolff & Donnelly, LLP

(57) ABSTRACT

A method and apparatus for processing user-submitted search information to permit a database to be searched regardless of the format and language of the user-submitted information. The user-submitted information is first categorized into one or more categories, where each category is a type of information such as a date, a proper name or a place. For each category pertaining to the user-submitted information, the search is refined by comparing the user-submitted information to a feature table containing specific data types corresponding to each category. From the results of any affirmative comparison with the feature table, a starting location within a corresponding search table is retrieved. The search is further refined by comparing the user-submitted information to the entries of the search table beginning at the starting location. From the results of any affirmative comparison with the search table entries a database address is obtained which is used to obtain a database entry sought after by the user.

21 Claims, 9 Drawing Sheets

(General English)

| Feature Table Entries | Search Table | |
|---|---|---|
| | Key Words | Database Addresses |
| | Albert Einstein | Address1 |
| | Aldrich | Address2 |
| Ale →  | Alec | Address3 |
| | | Address4 |
| | | Address5 |
| | Alex | Address6 |
| | Alexander | Address7 |
| | | Address8 |
| Alf → | Alf | Address9 |
| | Alfred | Address10 |
| | | Address11 |
| | | Address12 |
| | Alger | Address13 |
| | | Address14 |
| | Algernon | Address15 |
| | Allen | Address16 |

Fig. 7a (Chinese Last Names)

| Feature Table Entries | Search Table Key Words | Database Addresses |
|---|---|---|
| 孫 Sun → | 孫武 (Sun Wu) | Address20 |
| | 孫權 (Sun Chuan) | Address21 |
| | | Address22 |
| | 孫中山 (Sun Yat Son) | Address23 |
| | | Address24 |
| | | Address25 |
| 劉 Liu → | 劉秀 (Liu Sho) | Address50 |
| | 劉邦 (Liu Bun) | Address51 |
| | 劉備 (Liu Bay) | Address52 |
| 張 Zhang → | 張飛 (Zhang Fei) | Address60 |
| | 張學良 (Zhang Shei Liang) | Address61 |

Fig. 7b

METHODS FOR INTELLIGENT UNIVERSAL DATABASE SEARCH ENGINES

This application is a continuation to application Ser. No. 08/998,955, filed Dec. 29, 1997 pending.

BACKGROUND OF THE INVENTION

1. Field of the Invention

The present invention relates generally to methods for analyzing, categorizing, and searching information and the processing thereof, and, more particularly, relates to methods for analyzing and identifying a search inquiry in free format and in any language and retrieving information pertinent thereto.

2. Description of the Prior Art

In the information society of today, a large amount of information is received and processed either on a human level or at a computer level. At the computer level, information of all types comes in various different formats and presentations which always requires certain amount of interpretation by the human reader before it is understood by the same. This is a relatively intuitive process at the human level. However, in providing information to a computer device, the information has to be a certain type and has to be provided in a certain format before it can be properly recognized and categorized by the computer device along with its software applications. Otherwise, the information will be refused by the corresponding software application. For example, in conducting a search for certain information content from an information source such as the internet or a database, information is generally searched and found by the matching of one or more keywords in a designated language where each and every reference containing the given keywords are retrieved and provided to the user. This approach is a brute force approach where the search is conducted by the simple matching of keywords with references without any additional preprocessing. Optionally, given keywords can be accompanied by flags indicating the type of keywords and the search scope. Here, a particular type of information in a specific format is provided to the computer device to limit the search scope. Thus, in one case, a search inquiry in a particular language is provided in a free format where references are retrieved indiscriminately. In the second case, a search inquiry in a particular language is provided in a specific (and required) format to narrow the search results. In either case, there is no intelligent analysis of the search inquiry by the computer device and the user is required to provide an intelligent search inquiry in a designated language and format.

It would be desirable to allow the user to input a search inquiry unrestricted as to format as well as language where the search inquiry is processed in an intelligent manner to facilitate the searching and retrieving of information most likely to be desired by the user.

SUMMARY OF THE INVENTION

It is therefore an object of the present invention to provide a method for analyzing and categorizing a search inquiry prior to the searching and retrieving of information pertinent to the search inquiry.

It is another object of the present invention to first categorize a search inquiry in a general category based upon the code representing the search inquiry.

It is yet another object of the present invention to provide a feature table corresponding to the categorized general category where said feature table has entries representative of the features and characteristics of said category and each entry has a corresponding address pointing to a position in a corresponding search table.

It is yet another object of the present invention to provide a search table corresponding to the classified general category and search said search table to retrieve information pertinent to said search inquiry.

Briefly, a presently preferred embodiment of the present invention provides a search method where a search inquiry in any language and any format is first categorized into a category or a subcategory, based upon the code representing the characters of the search inquiry. A feature table and a search table corresponding to said category or subcategory is searched to find database entries pertinent to said search inquiry. The search inquiry may be used on a wide variety of platforms and applications including searching on the internet.

An advantage of the present invention is that it provides a method for analyzing and categorizing a search inquiry prior to searching and retrieving of information pertinent to the search inquiry.

Another advantage of the present invention is that it first categorizes a search inquiry in a general category based upon the code representing the search inquiry.

Yet another advantage of the present invention is that it provides a search table corresponding to the classified general category and searching said search table to retrieve information pertinent to said search inquiry.

These and other features and advantages of the present invention will be understood upon examining the figures and reading the following detailed description of preferred embodiment of the invention.

IN THE DRAWINGS

FIGS. 7a and 7b illustrate examples of feature tables and search tables and their contents.

DETAILED DESCRIPTION OF THE PREFERRED EMBODIMENTS

The present invention and embodiments thereof are not limited to a specific computer platform and may be implemented in a variety of devices having various level of computing power and memory.

Figure 1A:
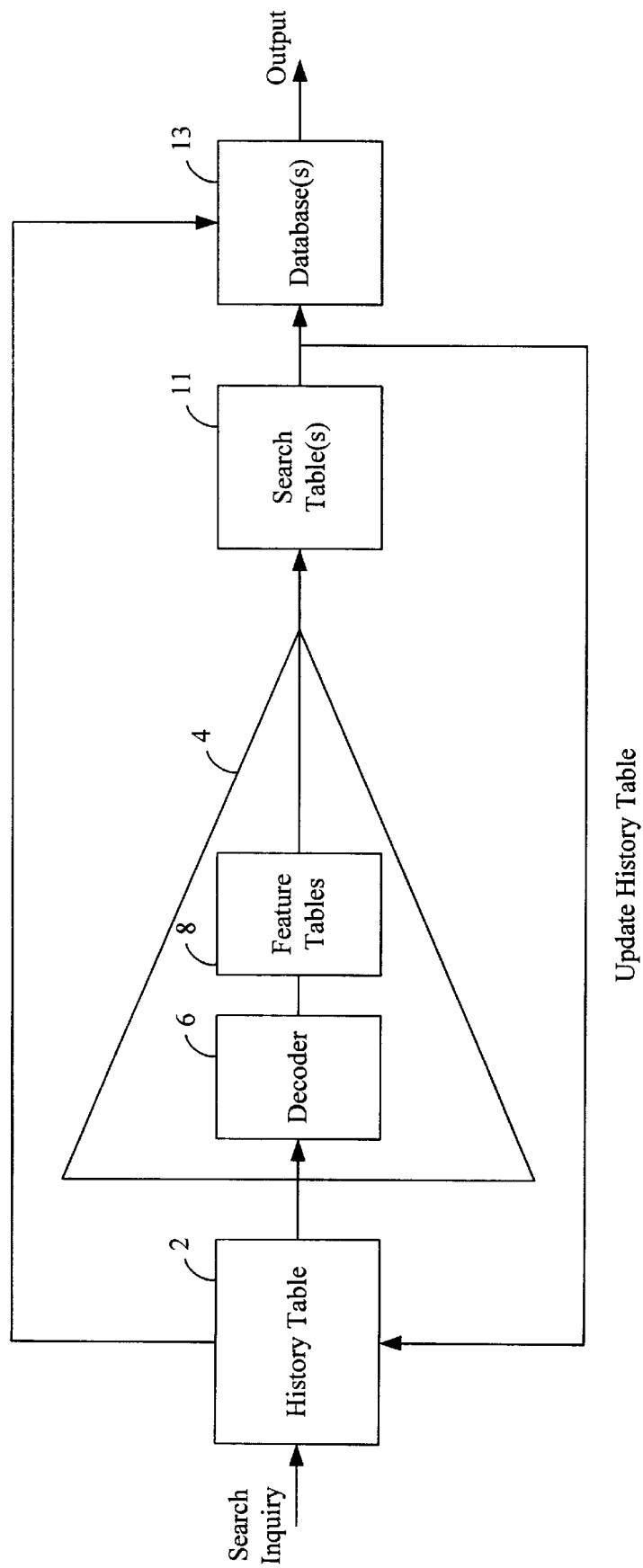
FIG. 1a illustrates a block diagram of the preferred embodiment of the present invention.

Referring to FIG. 1a, an illustration in block diagram form of a presently preferred embodiment of the present invention is presented. A search inquiry is provided as input and it is compared against entries in a history table 2. If there is a match found, meaning that this search inquiry was previously processed and the corresponding database addresses are already available in the history table, the corresponding database addresses are retrieved from the history table to find the corresponding entries from the database(s) 13. If there is not a match found in the history table 2, the search inquiry is processed by a point filter 4 which includes a decoder 6 and a feature table processing block 8. The decoder categorizes the search inquiry into a particular category with an associated feature table. Through the use of the associated feature table, the particular portion of a search table most pertinent to the search inquiry is indicated for further searching. By accessing the search table 11, the search inquiry is compared against the entries in it to find the most pertinent match or matches and the corresponding database address(es). By using the database address(es), the entries corresponding to the database addresses can be retrieved and displayed to the user.

Figure 1B:
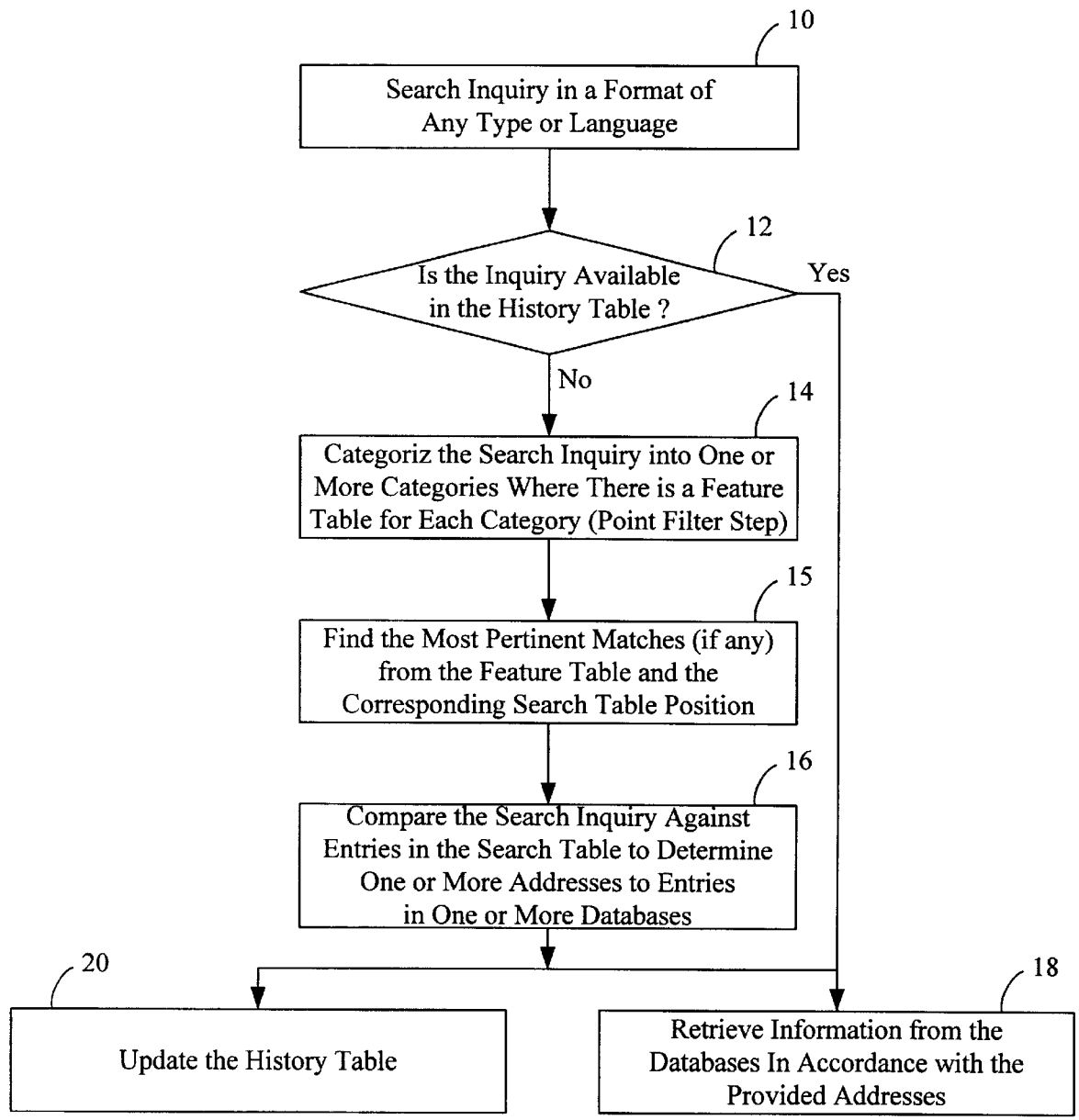
FIG. 1b shows a flow chart illustrating the general processing steps of a presently preferred embodiment of the present invention.

Referring to FIG. 1b, a flow chart illustrating the generally processing steps of a presently preferred embodiment of the present invention is illustrated. In a first step 10, an user is allowed to provide a search inquiry unrestricted as to form and in a language of his or her choice. For example, an inquiry may be "$100", "1975", "Washington D.C.", "Beijing" (in Chinese), "tofu" (in Japanese), "Sun Yat-San" (in Chinese), etc. The inquiry can be a phrase or a sentence. Once the search inquiry has been received, it may optionally be preprocessed to identify the most pertinent words (referred to as keywords or headwords). For the examples provided above, preprocessing would generate keywords (which is also referred to as the search inquiry).

In the next step 12, if this particular search inquiry or keywords are in the history table—meaning that the same search was previously conducted, it is retrieved from the history table along with the associated database addresses. The database addresses allow information to be retrieved from the database(s). If the keywords or search inquiry is not in the history table, the search inquiry is analyzed and tested in accordance with a predefined hierarchy (step 14) to categorize the search inquiry into one or more available categories where there is a feature table corresponding to each category. Once an inquiry has been categorized into one or more available categories, the search inquiry is compared to the entries in the feature table or tables corresponding to the identified category or categories, where the comparison is conducted in a predefined hierarchical manner as well. As a result of the comparison process, one or more pointers to the starting location on the corresponding search table or tables to begin the matching process (step 15). The entries in the search table are then compared against the search inquiry to find matches (step 16). As a result of this process, a number of database addresses can be obtained. In the next step (step 18), the database entries associated with the database addresses are retrieved and provided to the user. Also, the history table is updated to include this search inquiry and the associated addresses (step 20).

Figure 2:
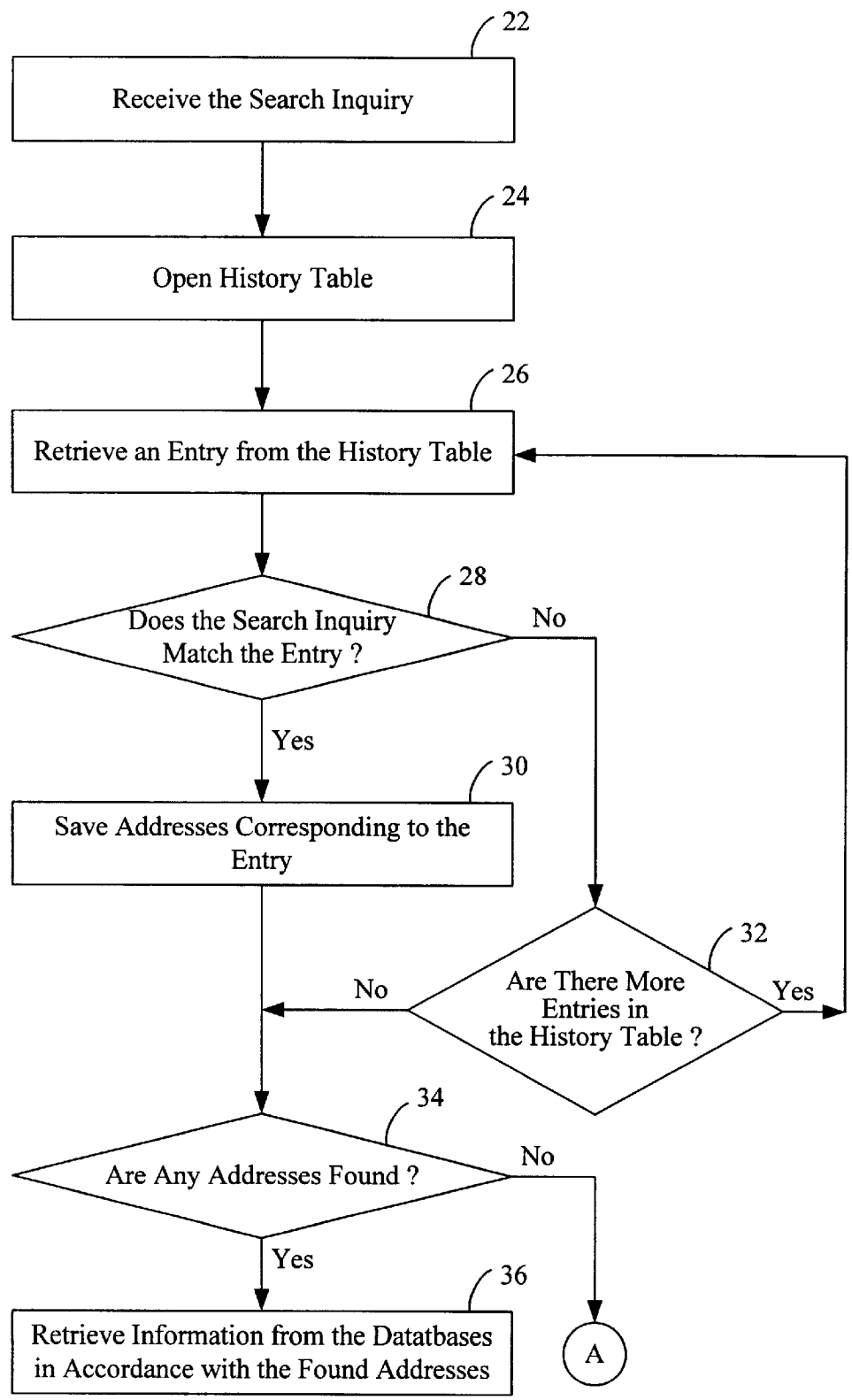
FIG. 2 illustrates a flow chart showing the steps in checking the history table.

Referring to FIG. 2, a flow chart showing the steps in checking the history table is provided. This flow chart generally corresponds to steps 10, 12, and 18 of FIG. 1b. In the initial steps (steps 22 and 24), the search inquiry is received and the history table is opened. An entry from the history table is retrieved (step 26) and compared to the search inquiry (step 28). If there is a match, the database address(es) corresponding to the particular history table entry is retained (step 30). If there is not a match and if there are more entries in the history table (step 32), those entries are retrieved and compared. If there is one or more addresses found (step 34), information is retrieved from the database (s) in accordance with the found address(es) step 36).

Figure 3:
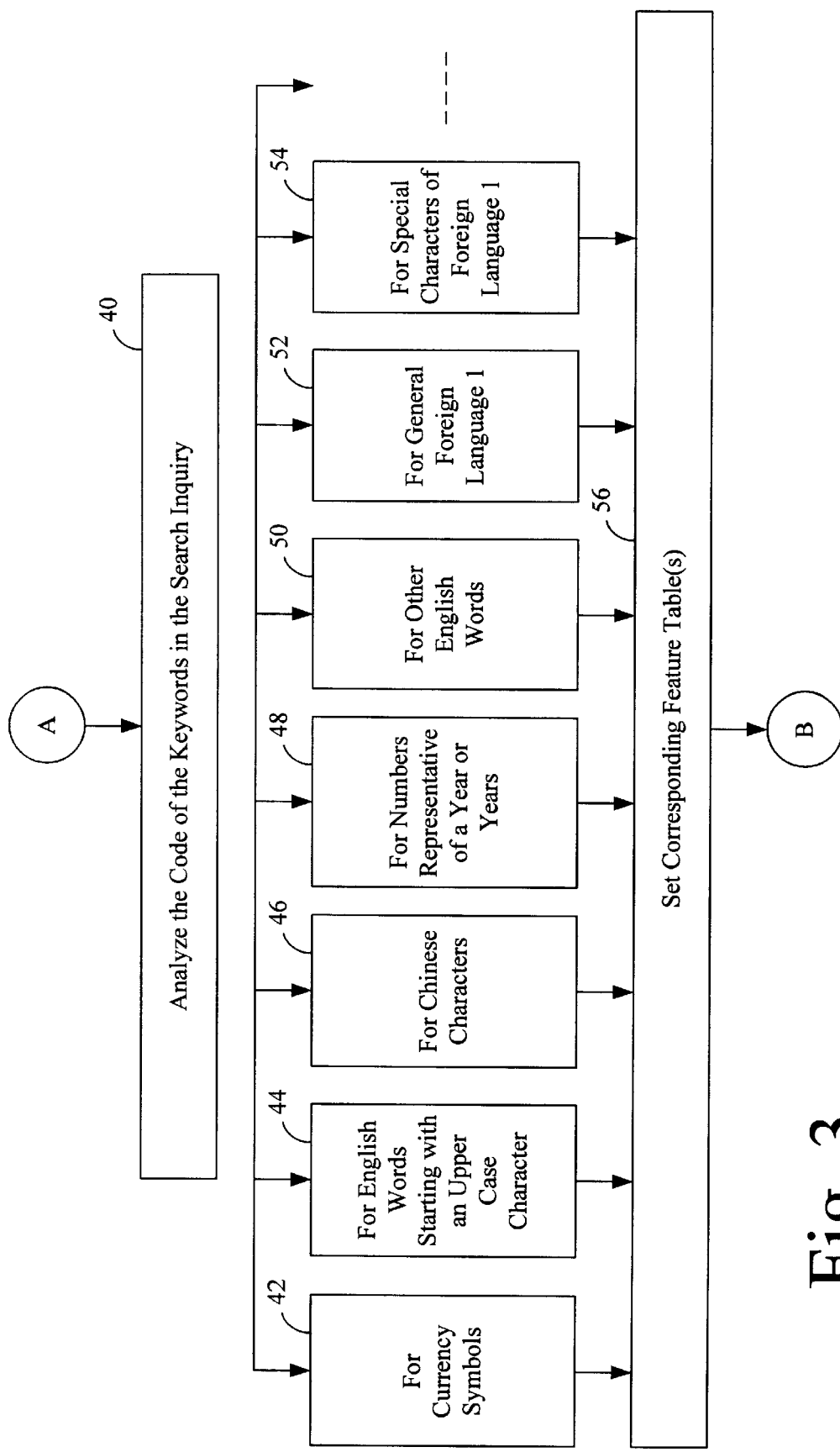
FIG. 3 shows a flow chart illustrating the steps in analyzing the code(s) representing a search inquiry.

Referring to FIG. 3, which relates generally to step 14 of FIG. 1b and flowing from connector A of FIG. 2, the code representing the search inquiry is analyzed (step 40). The code is generally ASCII for English representation and there are other standardized codes for other languages. Information as to the specific types of codes can be predefined or provided by the operating system. By analyzing the codes of the search inquiry, the search inquiry can be categorized into one or more categories. For example, a code greater than 8000h represents Chinese, 41h to 5Ah represents uppercase English characters, 61h to 7Ah represents lower case English characters, and etc. If the search inquiry contains special currency representation such as currency symbols "$", "£", or "¥" or words representing currency "NT" (step 42), it is categorized as an inquiry for currency exchange rates and the corresponding feature table is set and the necessary parameters passed. This particular step can be refined to look for numbers in addition to words or symbols for currency representation to ensure that the search inquiry is an inquiry requesting exchange rate information.

If the search inquiry starts with an uppercase English character (step 44), it is likely that the search inquiry is related to a name or place and the corresponding feature table for the English name or place is set. If the search inquiry is otherwise regular English words (step 50), a corresponding feature table is set. If the search inquiry is in Chinese (step 46), by looking at the first Chinese character, it can be determined whether if the search inquiry is related to a name or place. By looking at two or more characters, the general subject matter can be suggested and the corresponding feature table selected. If the search inquiry presents numbers, in any language, resembling a particular date or year(s) (step 48), the corresponding search table is set. The analysis of the search inquiry can be easily extended to other languages and the special characteristics of these languages conducive for searching, (steps 52 and 54). In any case, the corresponding feature table is set for further refined search (step 56). Although what is illustrated does not show a priority in the categories compared, a presently preferred embodiment provides a priority hierarchy to avoid possibility of confusion. In this hierarchy, it is identified in the following order: exchange rate, date or year, Chinese, and English.

Figure 4:
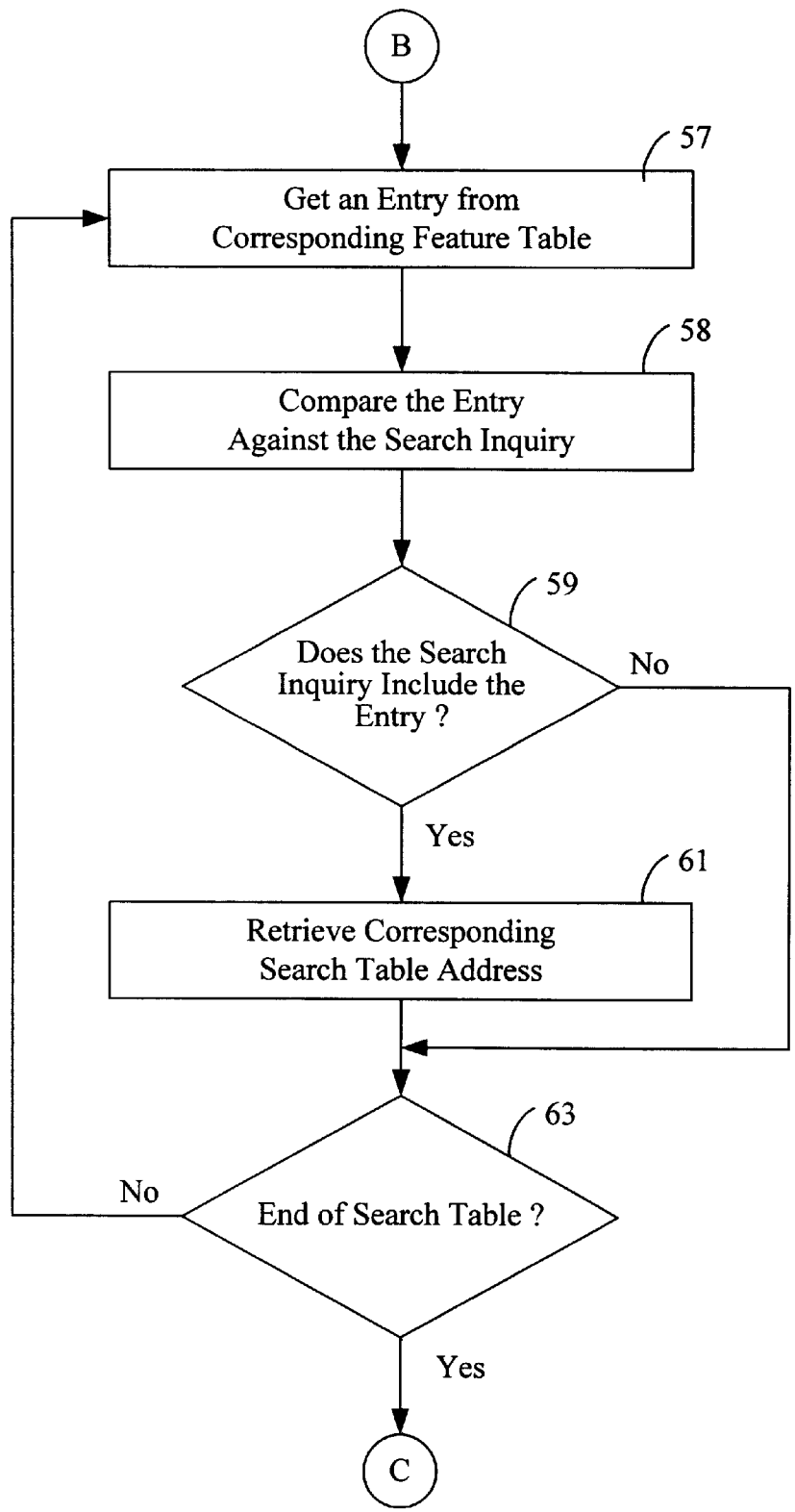
FIG. 4 illustrates the steps for searching through a corresponding feature table.
Figure 5:
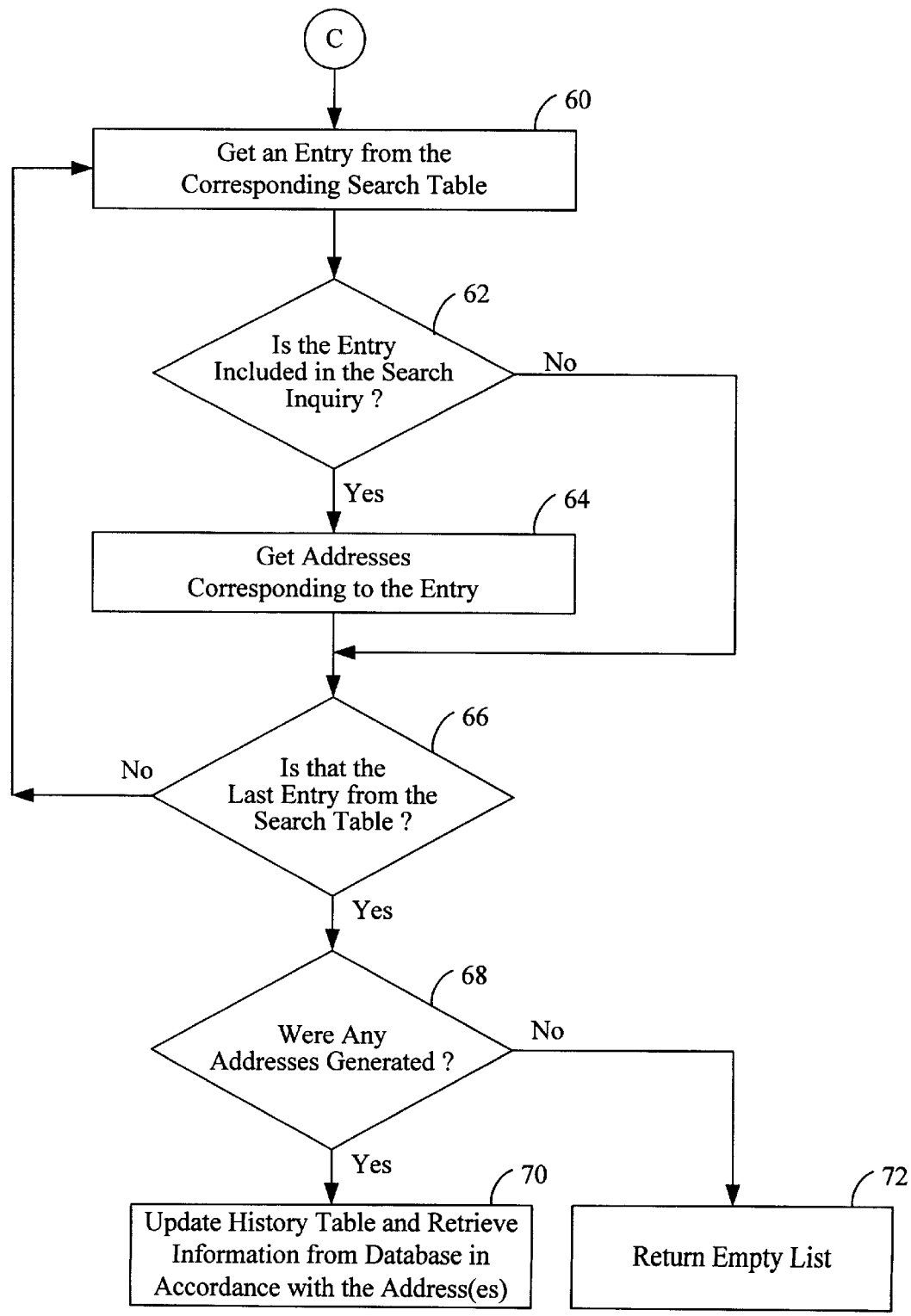
FIG. 5 illustrates the steps for searching through a corresponding search table.

FIG. 4 illustrates the steps for searching through the corresponding feature table following from connector B of FIG. 3. From the designated feature table, an entry from the table is retrieved (step 57) and compared to the search inquiry (step 58). If the entry is part of the search inquiry (steps 59 and 61), the address indicating the starting location within a corresponding search table is retrieved and saved. If the entry is not part of the search inquiry, the next step is to test for end of the table (step 63). If there are more entries in the feature table, the next one is retrieved and tested. If there are no more entries, the next processing steps are illustrated in FIG. 5. Thus, through the use of feature tables, a search inquiry can be categorized into a predefined category and compared to the entries in a corresponding feature table pertinent to the category and the search inquiry. In this manner, the categories can be customized and defined as desired or they can be generated from the content of the search tables. An example of a feature table is a table of Chinese last names provided to determine if the search inquiry represents a person's name the same can be done for Japanese geographical locations (in Japanese); German automobiles (in German), etc. Thus, any categories which can be distinguished by its unique features or characteristics can be set apart as a category by listing the corresponding unique features or characteristics of the category in a feature table.

FIG. 5 illustrates the steps for searching through the corresponding search table following from connector C of FIG. 4. From the address(es) to the starting location(s) within a corresponding search table, an entry from the search table is retrieved (step 60) and compared to the search inquiry (step 62). If there is a match, the database address (es) corresponding to the particular search table entry is saved to retrieve the associated database entries (step 64). If there is not a match and if there are more entries (step 66), the next entry is fetched and compared. If there are any database addresses obtained from the search table (step 68), the history table is updated to include the search inquiry and the associated database addresses, and the corresponding database entries associated with database addresses are retrieved and provided to the user (step 70). If there are no addresses found, the search inquiry results in an empty list and the user is informed accordingly (step 72).

Figure 6:
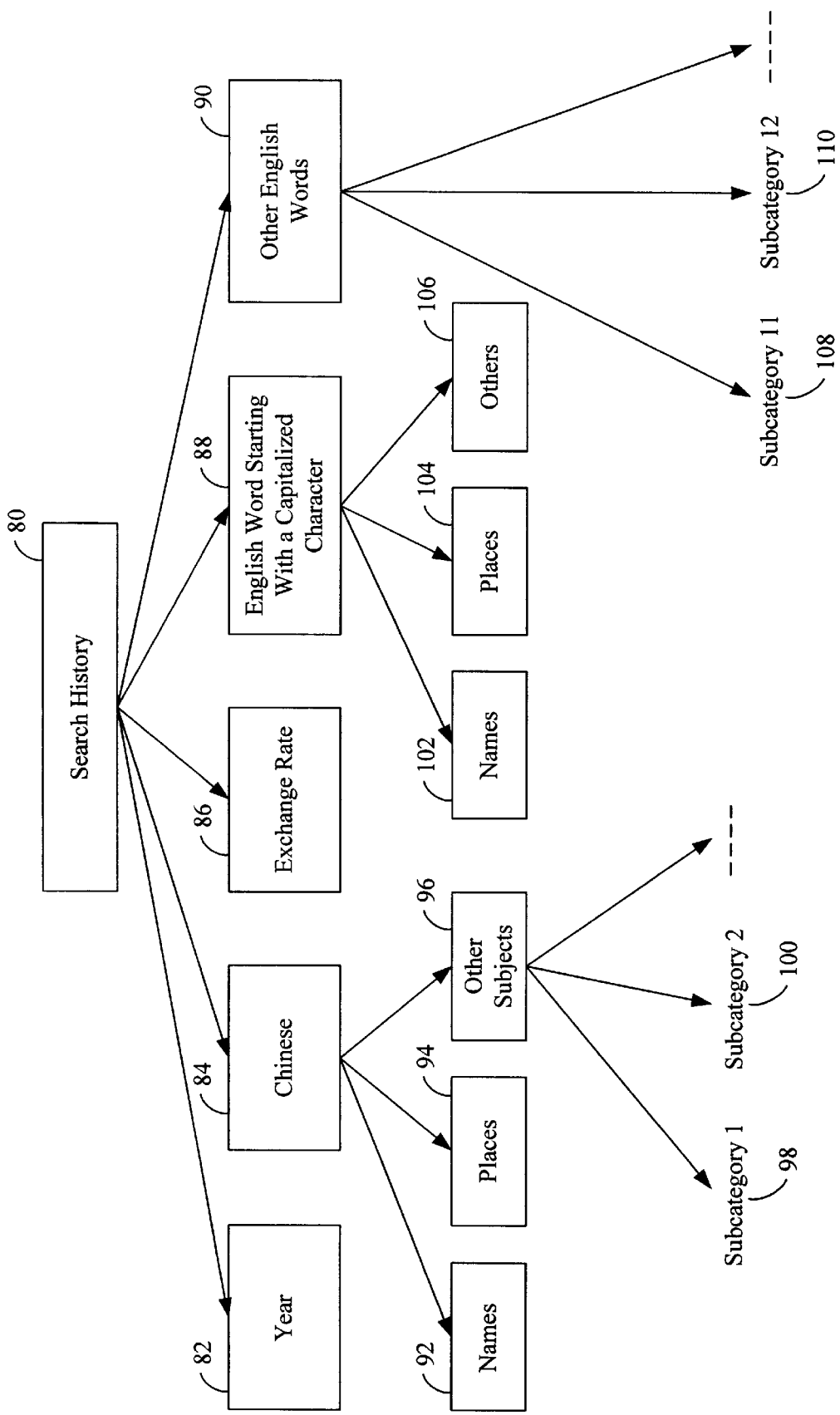
FIG. 6 illustrates the categories and subcategories for one embodiment of the present invention.

FIG. 6 illustrates the categories and subcategories for one embodiment of the present invention. The search inquiry 80 may be categorized into a year inquiry 82 where information related to that year is searched and retrieved. It may also be categorized as an inquiry in Chinese 84 where, according to the first character, it may be categorized as a name or place 92 and 94, or, according to the first two characters, it may be categorized into a particular subject matter 98 and 100, and so on. It may also be categorized as an exchange rate inquiry. For inquiry in English starting with a capitalized character 88, it may be categorized as a name 102, place 104, or otherwise 106. For other English words, it is categorized according to its meaning or meanings 108, 110.

FIGS. 7a and 7b provide illustrations of feature table entries mapping to locations within a search table. Generally speaking, the search table is built in accordance with a certain order. For example, a search table generally contains information in the same language where the same or similar keywords for the search inquiry (subject matter) are placed near each other. Moreover, keywords sharing one or more similar characters are generally grouped together where keywords positioned in the same place in the search inquiry and the number of key words further refined the placement of the keywords in the search table. In FIG. 7a, a feature table listing keywords (words characteristic of the features of the category) in one column, and a corresponding search table having entries in one column and database addresses in a second column are illustrated. Each of the feature table entries points to a starting location in the corresponding search table and each entry in the search table is linked with one or more database addresses. Some of the entries are linked to a single database address while other keywords are linked to more than one database addresses. As illustrated, the feature table entry "Alf" points to a starting location within the corresponding search table which is also "Alf" in this particular case. In FIG. 7b, a feature table and search table in Chinese (with English translation) is illustrated. Here, the feature table entries are Chinese last names. If there is a match between the first character of the search inquiry and an entry in this table, the search inquiry would be tested against entries in the corresponding search table. If there is a match found in the search table, the database address related to the matched entry would be saved and the corresponding database entry retrieved for display. Note that the keywords of the feature table can be listed in an preferential order as explained above.

Although the present invention has been described in terms of a specific embodiment it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A computer method for searching information from a variety of sources based upon a provided search inquiry, said search inquiry being in any format and language, comprising the steps of:

receiving a search inquiry, in any format and language, having one or more characters where each character is represented by a code;

categorizing said search inquiry into one or more of a plurality of categories, each of said categories having a corresponding feature table having entries representative of the characteristics of said category;

comparing entries in said feature table with said search inquiry to generate one or more position indicators to positions of one or more entries in one or more search tables, each of said search tables having entries each including a keyword and one or more corresponding database addresses, the same or similar keywords being placed near each other;

comparing said search inquiry with entries in said search table starting with the entries at positions as indicated by said position indicators to determine one or more database addresses corresponding to said search inquiry;

retrieving and displaying one or more entries from one or more databases corresponding to said one or more database addresses, and updating the history table entries if said search inquiry was not found in the history table.

2. A computer method as recited in claim 1, wherein said step of categorizing the search inquiry into one or more of a plurality of categories is based on the one or more codes representative of the search inquiry.

3. A computer method as recited in claim 1, wherein feature table entries are tabulated from corresponding search table entries.

4. A computer method as recited in claim 1, wherein feature table entries are tabulated from features and characteristics pertinent to the subject matter of the corresponding category.

5. A computer method as recited in claim 1, wherein said categories include currency symbols, upper case English words, Chinese characters, dates, and other English words.

6. A computer method as recited in claim 5, wherein the Chinese characters category is further divided into Chinese names for persons and geographical places.

7. A computer method for searching information from a variety of sources based upon a provided search inquiry, said search inquiry being in any format and language, comprising the steps of:

receiving a search inquiry, in any format and language, having one or more characters, wherein each character is represented by a code;

categorizing said search inquiry into one or more of a plurality of categories if said search inquiry does not match with at least one entry in a history table, each of said categories having a corresponding feature table having entries representative of the characteristics of said category;

comparing entries in said feature table with said search inquiry to generate one or more position indicators to positions of one or more entries in a search table, each of said search tables having entries each including a keyword and one or more corresponding database addresses, the same or similar keywords being placed near each other;

comparing said search inquiry with entries in said search table starting with the entries at the positions as indicated by said position indicators to determine one or more database addresses corresponding to said search inquiry;

retrieving and displaying entries from one or more databases corresponding to said one or more database addresses; and updating the history table entries if said search inquiry was not found in the history table.

8. A computer method as recited in claim 7, wherein the step of categorizing said search inquiry into one or more of a plurality of categories is based upon the one or more codes representative of the search inquiry.

9. A computer method as recited in claim 7, wherein feature table entries are tabulated from corresponding search table entries.

10. A computer method as recited in claim 7, wherein feature table entries are tabulated from features and characteristics pertinent to the subject matter of the corresponding category.

11. A computer method as recited in claim 7, wherein said categories include currency symbols, upper case English words, Chinese characters, dates, and other English words.

12. A computer method as recited in claim 11, wherein the Chinese characters category is further divided into Chinese names for persons and geographical places.

13. A program storage device readable by a machine tangibly embodying a program of instructions executable by the machine to perform method steps for searching information from a variety of sources based upon a provided search inquiry, said search inquiry being in any format and language, said method comprising the steps of:

receiving a search inquiry, in any format and language, having one or more characters where each character is represented by a code;

categorizing said search inquiry into one or more of a plurality of categories, each of said categories having a corresponding feature table having entries representative of the characteristics of said category;

comparing entries in said feature table with said search inquiry to generate one or more position indicators to positions of one or more entries in one or more search tables, each of said search tables having entries each including a keyword and one or more corresponding database addresses, the same or similar keywords being placed near each other;

comparing said search inquiry with entries in the search table starting with the entries at positions as indicated by said position indicators to determine one or more database addresses corresponding to said search inquiry; and retrieving and displaying one or more entries from one more databases addresses corresponding to said one or more database address; and updating the history table entries if said search inquiry was not found in the history table.

14. A program storage device as recited in claim 13, wherein said categorizing step the search inquiry is categorized into one or more of a plurality of categories based upon the one or more codes representative of the search inquiry.

15. A program storage device as recited in claim 13, wherein said feature table entries are tabulated from corresponding search table entries.

16. A program storage device as recited in claim 13, wherein said feature table entries are tabulated from features and characteristics pertinent to the subject matter of the corresponding category.

17. A program storage device as recited in claim 13, wherein said categories includes currency symbols, upper case English words, Chinese characters, dates, and other English words.

18. A program storage device as recited in claim 17, wherein the Chinese characters category is further divided into Chinese names for persons and geographical places.

19. A computer method for searching information from a variety of sources based upon a provided search inquiry, the search inquiry being in any format and language and formed from one or more characters each being represented by a character code, by using a search table having entries composed of keywords and associated database addresses, wherein the same or similar keywords are placed near each other, and wherein the database addresses point to data items in a database, and a plurality of feature tables each having entries composed of pointers to search table entries and search inquiry characters, the method comprising the steps of:

(a) receiving the search inquiry;

(b) comparing the character codes of the search inquiry characters with entries in the plurality of feature tables to select relevant feature tables from the plurality of feature tables, the selected feature tables serving to categorize the characters of the search inquiry;

(c) comparing the search inquiry to the search inquiry characters of the selected feature tables to find any matches;

(d) retrieving a search table pointer from the feature table at any matched entry;

(e) comparing the search inquiry to the keywords in said search table starting at the retrieved search table pointer to find any keyword matches, (f) retrieving a database address from the search table at any matched keyword entry;

(g) retrieving and displaying information from the database at the retrieved database address.

20. A computer method for searching information as recited in claim 19, wherein the method for searching uses a history table having entries composed of search inquiries and database addresses corresponding to the history table search inquiries; and further comprising the steps of:

prior to step (b), (h) comparing the search inquiry characters with entries in the history table to find any matches;

if a match is not found, (j) continuing at step (b); and (k) prior to step (f), updating the history table with an entry that includes the search inquiry and retrieved database address; and if any match is found, (l) retrieving the database address from the history table at any matched entry; and (m) continuing at step (g).

21. A method as recited in claim 19, wherein the plurality of feature tables is organized into at least one predefined hierarchy having a feature table at the top of the at least one predefined hierarchy; and wherein step (b) is performed starting at the top feature table of the at least one predetermined hierarchy.

* * * * *